US012655338B2

(12) United States Patent
Boucké

(10) Patent No.: US 12,655,338 B2
(45) Date of Patent: Jun. 16, 2026

(54) DECORATIVE PANEL AND DECORATIVE COVERING

(71) Applicant: i4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 0 days.

(21) Appl. No.: 18/724,644

(22) PCT Filed: Dec. 28, 2022

(86) PCT No.: PCT/EP2022/087958
§ 371 (c)(1),
(2) Date: Jun. 27, 2024

(87) PCT Pub. No.: WO2023/126440
PCT Pub. Date: Jul. 6, 2023

(65) Prior Publication Data
US 2025/0066655 A1 Feb. 27, 2025

(30) Foreign Application Priority Data
Dec. 28, 2021 (NL) ...................................... 2030320

(51) Int. Cl.
| | |
|---|---|
| *B32B 3/06* | (2006.01) |
| *B32B 27/06* | (2006.01) |
| *B32B 27/18* | (2006.01) |
| *C09K 5/06* | (2006.01) |
| *E04F 13/08* | (2006.01) |
| *E04F 15/02* | (2006.01) |
| *E04F 15/10* | (2006.01) |

(52) U.S. Cl.
CPC ................ *C09K 5/063* (2013.01); *B32B 3/06* (2013.01); *B32B 27/06* (2013.01); *B32B 27/18* (2013.01); *E04F 13/0894* (2013.01); *E04F 15/02038* (2013.01); *E04F 15/10* (2013.01); *B32B 2250/40* (2013.01); *B32B 2264/303* (2020.08); *B32B 2264/403* (2020.08); *B32B 2307/554* (2013.01); *B32B 2607/00* (2013.01); *E04F 2201/0138* (2013.01); *E04F 2201/0153* (2013.01); *E04F 2201/023* (2013.01); *E04F 2201/042* (2013.01); *E04F 2201/043* (2013.01)

(58) Field of Classification Search
CPC .. E04F 13/0894; E04F 15/02038; B32B 3/06; B32B 2307/304; B32B 2607/00; C09K 5/063
See application file for complete search history.

(56) References Cited

U.S. PATENT DOCUMENTS

| | | | |
|---|---|---|---|
| 2012/0112122 A1 | 5/2012 | Jung et al. | |
| 2013/0034732 A1* | 2/2013 | Parker .................... | C09K 5/063 252/74 |
| 2020/0408471 A1* | 12/2020 | Zhang ................... | E04B 1/7608 |

FOREIGN PATENT DOCUMENTS

| | | |
|---|---|---|
| DE | 102013110578 A1 | 3/2015 |
| EP | 2451849 B1 | 9/2013 |

* cited by examiner

*Primary Examiner* — Elizabeth E Mulvaney
(74) *Attorney, Agent, or Firm* — The Webb Law Firm

(57) ABSTRACT

A decorative PCM floor panel, in particular a floor panel, including a core provided with an upper side and a lower side. A decorative PCM floor covering, including a plurality of, preferably interconnected, floor panels according to the invention.

18 Claims, 3 Drawing Sheets

DECORATIVE PANEL AND DECORATIVE COVERING

CROSS-REFERENCE TO RELATED APPLICATIONS

This application is the United States national phase of International Patent Application No. PCT/EP2022/087958 filed Dec. 28, 2022, and claims priority to The Netherlands Patent Application No. 2030320 filed Dec. 28, 2021, the disclosures of which are hereby incorporated by reference in their entireties.

BACKGROUND OF THE INVENTION

Field of the Invention

The invention relates to a decorative panel, in particular a floor panel, a wall panel, or a ceiling panel, comprising a core provided with an upper side and a lower side. The invention also relates to a decorative covering, in particular a floor covering, a wall covering, or a ceiling covering, comprising a plurality of panels according to the invention.

Description of Related Art

During the last decennia, and along with the development of society and the improvement of living standards, requirements in aesthetics and safety of interior decorations are gradually increased. Decorative floor panels have been improved significantly the last years, wherein traditional core materials, such as HDF and MDF, have been replaced more and more by thermoplastic materials, in particular PVC due to its waterproof properties and processability. A drawback of these thermoplastic materials is that these materials are not entirely stable upon temperature fluctuations, which may lead to gaps in between panels and/or cupping (warping) of the panels. On top of the core, typically a decorative top structure is applied to improve the aesthetical appearance of the floor panel. These floor panels are often provided with coupling profiles configured to mutually connect adjacent floor panels, which results in a so-called floating floor. However, there is a rising need to become more and more energy efficient. Buildings are more and more isolated to decrease the energy costs related to heating and cooling indoor rooms. However, due to the temperature sensitivity of thermoplastic based panels, these panels can often not be applied in combination with underfloor heating, and even if so, this does often not yield in an efficient situation from an energy point of view.

SUMMARY OF THE INVENTION

It is an object of the present invention to provide an improved decorative panel, in particular a floor panel, with improved thermal properties.

It is another object of the present invention to provide an improved thermoplastic based decorative panel, in particular a floor panel, with improved thermal properties.

It is a further object of the present invention to provide an improved decorative panel, in particular a floor panel, with improved enthalpy storage properties.

At least one of these objects can be achieved by providing a decorative panel, in particular a floor panel, wall panel, ceiling panel, or alternative panel, comprising:
a core provided with an upper side and a lower side, a decorative top structure affixed, either directly or indirectly, on said upper side of the core, and
preferably a first coupling profile situated at a first panel edge, and preferably a second coupling profile situated at a second panel edge, wherein the first coupling profile is configured to co-act with a second coupling profile of an adjacent panel, preferably such that the panels are locked with respect to each other both in horizontal and vertical direction,
wherein the core comprises at least one base material and phase-change material (PCM), in particular encapsulated PCM, embedded in said base material.

The floor panel according to the invention has several advantages. Firstly, due to the application of (encapsulated) PCM in the core, the core is provided with improved enthalpy storage properties. Due to the PCM, heat (or cold) can be stored temporarily in the PCM panels and be released at a later time point due to temperature changes, and/or be led away and utilized elsewhere. In phase change materials (PCMs), use is made of the latent heat of a phase change of the PCM for giving up heat of fusion during the solidification of the PCM and taking up heat of fusion during melting of the PCM, so that PCM may be regarded as a thermal accumulator. Because the heat of fusion of materials is much higher than the specific heat, a much higher specific energy density can be reached by utilizing latent heat than storage by means of sensible heat. This leads to more compact storage. By melting and solidifying at the melting temperature, also referred to as the phase change temperature (PCT), a PCM is capable of storing and releasing large amounts of energy compared to sensible heat storage. Heat is absorbed or released when the material changes from solid to liquid and vice versa or when the internal structure of the material changes. When PCMs reach their phase change temperature (their melting point), e.g. due to direct or indirect exposure to sun's rays, the PCM absorbs large amounts of heat at an almost constant temperature until all the material is melted. When the ambient temperature around the liquid PCM drops, the PCM solidifies, releasing its stored latent heat, which will heat up the panel, and hence the environment. In case the panel is used as outdoor panel, this may prevent the panel from becoming frozen, snowed under, and/or slippery, without needing an external costly heating system. In case the panel is used as indoor panel, this may heat up a room in which the panel(s) is/are installed, which will save energy and heating costs to keep the room's temperature at level. In hot environments or climates, this principle can be used to cool the decorative panels, which may for example be used to cool an outdoor floor covering (composed of said panels), which may e.g. act as walking surface and/or sports floor. Hence, depending on the temperature level of heat/cold storage, preferably a suitable PCM is sought with a suitable melting temperature in order to store heat or cold for release and use at a later time. Which PCM with which melting temperature is preferred strongly depends on the specific application of the decorative panel. For example, in case the decorative panel is used as outdoor panel in colder or moderate climates, a PCM with a lower melting point (e.g. 0 to 10 degrees Celsius) is typically preferred, while in case the decorative panel is used as outdoor panel in hot (desert) climates, a PCM with a lower melting point (e.g. 18 to 30 degrees Celsius) is typically preferred. In case the decorative panel is used as indoor panel in colder climates, a PCM with a moderate melting point (e.g. 18 to 26 degrees Celsius) is typically preferred. It is typically preferred to make use of temperature differences between daytime and night time, and to allow the PCM to undergo a phase change during this (cyclic) temperature fluctuation. An additional advantage of the decorative panel according to the invention is that the core has relatively good sound dampening properties due to the presence of the PCM. This leads to solid-solid and solid-liquid interfaces between the base material and the PCM which hinders the sounds transmission and stimulates the sound absorption, leading to improved acoustic properties of the core, and hence of the decorative panel as such.

Since the PCM based core is configured to absorb and release heat during a change in phase of the PCM, the decorative panels may be used as floor panel, wall, panel, ceiling panel, furniture covering panel, or as alternative surface covering element. As indicated above, generally the transition of the PCM will be from one of the first two fundamental states of matter—solid and liquid—to the other. The phase transition may also be between non-classical states of matter, such as the conformity of crystals, where the material goes from conforming to one crystalline structure to conforming to another, which may be a higher or lower energy state. Although PCM based upon a phase change between solid and gas, and between liquid and gas could also be applied, this is often less preferred due to leakage risks of the gaseous fraction (due to high gas pressures built up within the core).

Dependent on the base material used in the core as well as on the technology used to manufacture the core, the PCM, in solid state, could be embedded in the base material, wherein the PCM is in direct contact with the surrounding base material. The PCM could be formed by one or more layers embedded (thus be encapsulated) in the base material of the core. The PCM could also, additionally or alternatively, be embedded (and thus be encapsulated) as PCM capsules or PCM particles (particulate) in the base material of the core. These particles could have regular shapes, preferably substantially spherical or substantially ovoidal shapes, and/or could have irregular shapes. Preferably, the core comprises a plurality of PCM capsules substantially uniformly dispersed within at least one zone of an upper zone (upper section) and/or lower zone (lower section) of said base material, and preferably throughout said base material. In case the core is composed of a plurality of sublayers, for example by means of co-extrusion, the compositions of the sublayers typically differ, which also makes it possible to add PCM to at least one sublayer and not to add PCM to at least one other sublayer. This may e.g. be preferred to optimize the properties of the core as such, such as rigidity, dimensional stability, etcetera.

Preferably, the mean diameter of the PCM capsules is situated in between 5 and 75 micron, preferably in between 10 and 50 micron. This leads to micro-encapsulation (or nano-encapsulation) of PCM.

It is often preferred that the PCM capsules are composed of a, preferably substantially spherical or ovoidal, shell filled with PCM. The shell is typically made of a material which remains solid during operation, such that molten PCM will be kept within the shell. The shell is preferably substantially closed (sealed) to prevent leaking of PCM. The capsule core may, in addition to PCM, also comprise one or more additives, such as thermally conductive nanostructures, such as nanocarbons, nanometals, and nano metal oxides; a foam, a polymer, graphite, graphene, metal oxide, or combinations thereof, to improve the thermal performance of the PCM, and possibly further characteristics like latent heat capacity, melting temperature, density, viscosity, duration of the phase change, etc. This kind of microencapsulation of PCMs, wherein a shell is created around a PCM, can be carried out via various techniques, such sol-gel, emulsion polymerization, interfacial polymerization, suspension polymerization, coacervation, etcetera.

Preferably, the shell is at least partially made of a material chosen from the group consisting of: a metal (such as steel), a polymer, preferably a copolymer, and an inorganic material. The shell is preferably at least partially made of a material chosen from the group consisting of: styrene/methyl methacrylate (St/MMA) copolymer, polystyrene (PS), polymethylmethacrylate (PMMA), polyurea, melamine-formaldehyde (MF resin), urea-formaldehyde, gelatine-gum Arabic, gum Arabic-modified starch, chitosan, silk fibroin, soybean protein, 1-dodecanol, a biodegradable polymer, a biobased substance, and combinations thereof. The shell may also at least partially be made of an inorganic material, such as silica and titanium oxide. Biobased and/or biodegradable substances could be in particularly preferred as the increasing energy demand in conjunction with greater environmental concern has lifted the development of sustainable materials. Optionally, the shell is provided with a coating to improve the adhesion of the shell to the surrounding base material. In fact, the coating acts as compatibilizer between the shell material and the base material. This may lead to a coherent and relatively strong core. The coating may, for example, be a tie layer which is coated and/or grafted onto the shell material and which is configured to form non-covalent hydrogen bonds between the tie layer material and (hydroxyl groups of) the surrounding base material. An example of a grafted shell material is a maleic anhydride grafted shell material. Alternatively, cavities may be present in between at least a fraction of the PCM capsules and the base material. This typically occurs in case the shell material is not (well) suitable to adhere to the base material. Such cavities, in particular gas pockets or air pockets, could improve the sound dampening properties of the core.

Preferably, the PCM/shell weight ratio is between 80/20 and 50/50. In this manner, a suitable balance is found between maximizing the quantity of PCM and realizing a sufficiently stable and firm (strong) shell to prevent leakage of PCM material.

As indicated above, preferably, the PCM has a phase change temperature, in particular a melting temperature, which is situated in between approximately 5 and approximately 40 degrees Celsius, more preferably between 18 and 30 degrees Celsius, most preferably between 22 and 26 degrees Celsius. This latter temperature range is often preferred in case the decorative panel is used as indoor panel. In case PCM would have a melting trajectory instead of a specific melting point, then a mean value of the melting trajectory could be taken as melting point.

The PCM used in the decorative panel according to the invention can be of various nature and depends on the desired melting temperature. Typically, two types of PCM can be used: organic (carbon-containing) materials derived either from oil (petroleum), from plants or from animals, and, alternatively, salt hydrates, such as natural salts. Organic PCM(s) derived from plants or animals are also referred to as biobased PCM(s). Although paraffins are the most studied organic PCMs (see also below), paraffins are not environmental friendly, renewable or sustainable. It is therefore preferred to apply at least one biobased PCM chosen from the group consisting of: edible oils and fat, such as sunflower oil, palm fruit oil, and soybean oil; waste animal fat; non edible plant oils; waste cooking oil; and genetically modified oil. An example of a genetically modified oil is high laurate canola (i.e. rapeseed oil genetically modified to eliminate erucic acid and increase lauric acid.

Overall, the main advantages of biobased PCMs are that they are of renewable nature, in most cases successfully exhibit suitable latent heat, and useful melting-freezing temperature range, stable chemical composition, thermal stability, self-nucleating behaviour, availability, non-toxicity, and lower flammability compared to paraffins. They are biodegradable, can show limited supercooling and minimal environmental impact. In particular, in the case of biobased PCMs consisting mainly of fatty acids, the melting point is related to the carbon chain length, they show lower supercooling, low volume change along the phase transition, good thermal and chemical stability, no corrosivity and low vapor pressure. Preferably, the non-food biobased PCMs, such as non edible plant oils, waste cooking oil and genetically modified oil are the most promising types of biobased PCMs. They are of great potential as they meet many selection criteria, surpassing fossil fuel derived organic PCMs. Among these, waste cooking oil has an established supply chain and high availability due to the existing market, which is therefore one of the most preferred biobased PCMs. Waste cooking oils are edible oils of vegetable or animal origin which have been used to cook or fry to the point where they are no longer fit for human consumption. Their major sources include restaurants, fast food outlets, and food process industries. Waste cooking oil basically contains ester bonds of long chain fatty acids (i.e. triglyceride molecules), consequently, the incorporation of hydrolysed enzyme to waste cooking oil can produce C18 fatty acids such as stearic and oleic which can serve as biobased materials.

Animal fats such as tallow, lard and chicken fat are among the most widely produced by-products from the industrial agro-food sector. Waste animal fat typically comprises non-edible fatty pig and chicken parts, often characterized by approximately 42.5, 9.5, and 42% of monounsaturated, polyunsaturated, and saturated fatty acids respectively. The blend was reported to exhibit promising thermophysical properties and was considered a low-cost, non-toxic biocompatible PCM.

It may be preferred that the PCM is at least partially composed of a paraffin material, preferably chosen from the group consisting of: n-hexadecane, n-octadecane, n-nonadecane, and combinations thereof. Examples of (further) organic PCMs with their melting points are: paraffin 14-carbons (5.5° C.), formic acid (7.8° C.), paraffin 15-carbons (10° C.), caprilic acid (16.3° C.), paraffin 16-carbons (16.7° C.), acetic acid (16.7° C.), glycerin (17.9° C.), polyethylene glycol (20° C.), paraffin 17-carbons (21.7° C.), polylactic acid (18·26° C.), paraffin 18-carbons (28° C.), methyl palmitate (29° C.), paraffin 19-carbons (32° C.), trimyristin (33° C.), capric acid (36° C.), paraffin 20-carbons (36.7° C.), camphenilone (39° C.), docasyl bromide (40° C.), caprylone (40° C.), and paraffin 21-carbons (40.2° C.).

In case the PCM is a salt hydrates, then the salt hydrate is preferably chosen from the group—presented with their melting points—consisting of: $LiClO_3 \cdot 3H_2O$ (8° C.), $KF \cdot 4H_2O$ (19° C.), $Mn(NO_3)_2 \cdot 6H_2O$ ((25.8° C.), $CaCl_2 \cdot 6H_2O$ (28° C.), $LiNO_3 \cdot 3H_2O$ (30° C.), $Na_2SO_4 \cdot 10H_2O$ (32.4° C.), $Na_2CO_3 \cdot 10H_2O$ ((33° C.), $CaBr_2 \cdot 4H_2O$ (34° C.), $LiBr_2 \cdot 2H_2O$ (34° C.), $Na_2HPO_4 \cdot 12H_2O$ (35·44° C.), and $Zn(NO_3)_2 \cdot 6H_2O$ (36° C.).

Preferred examples of suitable eutectic PCM mixtures are: 55% $CaCl_2 \cdot 6H_2O$+45% $CaBr_2 \cdot 6H_2O$ (14.7° C.), 75% $CaCl_2 \cdot 6H_2O$+25% $MgCl_2 \cdot 6H_2O$ (21.4° C.), 66.6% $CaCl_2 \cdot 6H_2O$+33.3% $MgCl_2 \cdot 6H_2O$ (25° C.), 40% $Na_2CO_3 \cdot 10H_2O$+60% $Na_2HPO_4 \cdot 12H_2O$ (27.3° C.), 47% $Ca(NO_3)_2 \cdot 10H_2O$+33% $Mg(NO_3)_2 \cdot 10H_2O$ (30° C.), 25% $Na_2SO_4 \cdot 10H_2O$+75% $Na_2HPO_4 \cdot 12H_2O$ (31.2° C.).

Preferably, the quantity of PCM dispersed in the core is situated between 10 and 50% by weight of the core. In molten state, the PCM may weaken, to some extent, the core, as a result of which the amount of PCM in the core is preferably kept below or equal to 50% be weight of the core.

The core is typically most suitable for encapsulating the PCM, as the core is typically the most bulky body of the decorative panel with a preferred thickness between 2.5 and 13 mm. The decorative top structure is typically relatively thin with a preferred thickness of less than 1.5 mm, more preferably less than or equal to 1.2 mm, and even more preferably less than 0.5 mm, in particular less than 0.4 mm, such as 0.3 mm, which makes the decorative top structure typically less suitable for encapsulation of PCM, despite of the fact that the presence of PCM may affect the decorative effect of the decorative top structure, and hence of the panel as such. However, it could still be imaginable that the decorative top structure could comprise at least one polymeric wear layer in which further PCM capsules are encapsulated.

Preferably, the base material of the core comprises a (main) polymer, preferably a thermoplastic material, which is more preferably chosen from the group consisting of: PVC, PET, PP, PS, preferably unfoamed thermoplastic polyurethane (TPU), PE, in particular MDPE and/or HDPE; and combinations thereof. PS may be in the form of expanded PS (EPS) in order to further reduce the density of the floor covering element, which leads to a saving of costs and facilitates handling of the panels. Also in case another thermoplastic material is used, this material may be applied in foamed state in the core to reduce the density and costs. Nevertheless, it is also imaginable that the thermoplastic material used as main polymer is a solid polymer (i.e. an unfoamed polymer). Preferably, at least a fraction of the polymer used may be formed by recycled thermoplastic, such a recycled PVC or recycled PU. It is conceivable that a mix of virgin and recycled thermoplastic material is used to compose at least a part of the core. Instead of the thermoplastic material, also a thermoset polymer may be used, such as thermoset polyurethane.

At least a part of the core may be made of a composite of at least one polymer and at least one non-polymeric material, preferably a non-polymeric material other than the PCM. The PCM is preferred embedded in said composite material. The composite of the core layer preferably comprises one or more fillers, wherein at least one filler is preferably selected from the group consisting of: talc, chalk, wood, calcium carbonate, titanium dioxide, calcined clay, porcelain, glass, carbon particles, silicon particular, a(nother) mineral filler, a(nother) natural filler, a(nother) (auxiliary) polymer, such as an elastomer and/or latex. It is also imaginable that rubber and/or elastomeric parts (particles) are dispersed within the composite to improve the flexibility and/or impact resistance at least to some extent. The core may (thus) be rigid, semi-flexible, or flexible, and so can be the floor covering element as such. The filler may be formed by fibres, such as glass fibers or synthetic or genuine leather fibers, and/or may be formed by dust-like particles. Here, the expression "dust" is understood as small dust-like particles (powder), like bamboo dust, wood dust, cork dust, or non-wood dust, like mineral dust, stone powder, in particular cement, and combinations thereof. The average particle size of the dust is preferably between 14 and 20 micron, more preferably between 16 and 18 micron. The primary role of this kind of filler is to provide the core, and the panel as such, sufficient hardness and/or to decrease the cost price of the core, and hence of the panel. Moreover, this kind of filler will typically also improve the impact strength of the core and of the panel as such. Preferably, the filler content in the composite material of the core is between 30 and 75% by weight of the composite material of the core, more preferably between 50 and 60% by weight of the composite material of the core. Preferably, the polymer content in the composite material of the core is between 25 and 70% by weight of the composite material of the core, more preferably between 40 and 50% by weight of the composite material of the core. The polymer can either be foamed or unfoamed. Preferably, the composite of the core comprises at least one filler selected from the group consisting of: a salt, a stearate salt, calcium stearate, and zinc stearate. Stearates have the function of a stabilizer, and lead to a more beneficial processing temperature, and counteract decomposition of components of the composite during processing and after processing, which therefore provide long-term stability. Instead of or in addition to a stearate, for example calcium zinc may also be used as stabilizer. The weight content of the stabilizer(s) in the composite will preferably be between 1 and 5%, and more preferably between 1.5 and 4%. The composite of the core preferably comprises at least one impact modifier comprising at least one alkyl methacrylate, wherein said alkyl methacrylate is preferably chosen from the group consisting of: methyl methacrylate, ethyl methacrylate, propyl methacrylate, isopropyl methacrylate, t-butyl methacrylate and isobutyl methacrylate. The impact modifier typically improves the product performance, in particular the impact resistance. Moreover, the impact modifier typically toughens the core layer and can therefore also be seen as toughening agent, which further reduces the risk of breakage. Often, the modifier also facilitates the production process, for example, as already addressed above, in order to control the formation of the foam with a relatively consistent (constant) foam structure. The weight content of the impact modifier in the composite will preferably be between 1 and 9%, and more preferably between 3 and 6%. At least one plastic material used in the core layer is preferably free of any (toxic) plasticizer in order to increase the desired rigidity of the core layer, which is, moreover, also favourable from an environmental point of view. The core and/or another layer of the panel may comprise wood-based material, for example, MDF, HDF, wood dust, bamboo, prefabricated wood, more particularly so-called engineered wood. This wood-based material may be part of a composite material of the core.

Alternatively, the core is at least partially composed of another base material, such as a mineral material, like magnesium oxide, magnesium hydroxide, gypsum, (lightweight) concrete, and/or clay; and/or a wood or a wood-based material, such as HDF or MDF, or any other thermoplastic-free material, may be used as base material.

The density of the core typically varies from about 0.1 to 1.5 grams/cm3, preferably from about 0.2 to 1.4 grams/cm3, more preferably from about 0.3 to 1.3 grams/cm3, even more preferably from about 0.4 to 1.2 grams/cm3, even more preferably from about 0.5 to 1.2 grams/cm3, and most preferably from about 0.6 to 1.2 grams/cm3. It is imaginable that each panel comprises a plurality of core (sub)layers. Different core (sub)layers may have either identical compositions or different compositions, and/or different densities.

The shape of the decorative panel is typically rectangular and may be square or oblong. Alternative shapes, like a triangular shape, a pentagonal shape, a hexagonal shape, or a parallelogrammatic shape, may also be applied as shape for the floor panel according to the invention. The decorative panel may be a decorative slab, which may be rollable for transportation and storage purposes.

The decorative top structure is preferably at least partially transparent or translucent. The decorative top structure may be composed of a single layer, such as a printed decorative layer or a wear layer, but is typically composed of a plurality of layers. Preferably, the decorative top structure preferably comprises at least one decorative layer and at least one transparent wear layer and/or transparent top coating covering said decorative layer. Said top coating is also referred to as lacquer layer. The wear layer is preferably made of polyvinyl chloride, polyurethane, and/or an acrylic resin. The decorative top structure may additionally comprise at least one back layer situated in between said decorative layer and the core, wherein said back layer is preferably made of a vinyl or polyurethane compound. A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. Customized appearances, often realized by digital printing during the panel production process, are also imaginable. The decorative top structure may also be formed by a single layer. In an alternative embodiment, the decorative top structure is omitted, thus not applied, in the panel according to the invention. In this latter embodiment, the upper side of the core constitutes the upper side of the panel.

The decorative layer may be formed at least partially by a (digitally) printed thermoplastic layer or a (digitally) printed film, in particular paper film or thermoplastic film. The thermoplastic material used can be of various nature, but commonly PVC or TPU is preferred as material. The decorative layer may also be formed by an ink layer printed, preferably digitally printed, either directly or indirectly onto the core. Here, often a primer layer is applied onto the core, onto which primer layer the decorative print is digitally printed. The decorative top structure may at least partially be made of at least one biobased material, such as a polymer, in particular TPU, based upon plant-based oils such as canola oil or castor oil. The decorative layer, in particular a wear layer thereof, may additionally comprise mineral components such as chalk, aluminium oxide, graphene, and combinations thereof. This combines sustainability with extremely high levels of resilience for an improved panel performance in terms of acoustic properties, indentation resistance, etcetera.

Preferably, the floor panel is a floor panel with a first panel edge comprising a first coupling profile, and a second panel edge comprising a complementary second coupling profile being designed to, either directly or indirectly, interlock adjacent panels. In case of direct interlocking, a coupling profile of a panel will directly co-act with a complementary coupling profile of an adjacent panel. In case of indirect interlocking, typically a separate coupling structure (connecting element) is used to mutually couple a plurality of panels, wherein a coupling profile of each of said panels is coupled to the coupling structure. In coupled condition, the floor panels may abut each other, or, alternatively, may be positioned at a distance from each other.

The floor panel may further comprise a third panel edge comprising a third coupling profile, and a fourth panel edge comprising a complementary fourth coupling profile being designed to, either directly or indirectly, interlock adjacent panels.

In a preferred embodiment, the first coupling profile and/or the third coupling profile comprises: an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, preferably provided at a distant side of the upward tongue facing away from the upward flank, and wherein the second coupling profile and/or the fourth coupling profile comprises: a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking element are not formed by a bulge-recess combination, but by another combination of co-acting profiled surfaces and/or high-friction contact surfaces. In this latter embodiment, the at least one locking element of the first locking element and second locking element may be formed by a (flat or otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

In the abovementioned embodiment, it is imaginable that the first coupling profile (and/or third coupling profile) and the second coupling profile (and/or fourth coupling profile) are configured such that in coupled condition a pretension is existing, which forces coupled panels at the respective edges towards each other, wherein this preferably is performed by applying overlapping contours of the first coupling profile (and/or third coupling profile) and the second coupling profile (and/or fourth coupling profile), in particular overlapping contours of the downward tongue and the upward groove and/or overlapping contours of the upward tongue and the downward groove, and wherein the first coupling profile (and/or third coupling profile) and the second coupling profile (and/or fourth coupling profile) are configured such that the two of such panels can be coupled to each other by means of a fold-down movement and/or a vertical movement, wherein, in coupled condition, at least a part of the downward tongue of the second coupling profile (and/or fourth coupling profile) is inserted in the upward groove of the first coupling profile (and/or third coupling profile), such that the downward tongue is clamped by the first coupling profile (and/or third coupling profile) and/or the upward tongue is clamped by the second coupling profile (and/or fourth coupling profile).

It is imaginable that the first coupling profile is configured to co-act with the second coupling profile as well as with the fourth coupling profile, and that the third coupling profile is also configured to co-act with the second coupling profile as well as with the fourth coupling profile.

In an embodiment of the panel according to the invention, the first coupling profile and/or the third coupling profile comprises: a sideward tongue extending in a direction substantially parallel to the upper side of the core, at least one second downward flank lying at a distance from the sideward tongue, and a second downward groove formed between the sideward tongue and the second downward flank, and wherein the second coupling profile and/or the fourth coupling profile comprises: a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

It is conceivable that each first coupling profile and each third coupling profile is compatible—hence may co-act and interlock—with each second coupling profile and each fourth coupling profile. This may also apply in case interlocking coupling profiles do not have a completely complementary shape.

In a preferred embodiment, the core comprises a laminate of a plurality of core layers, wherein at least one core layer comprises at least one base material and encapsulated phase-change material (PCM) embedded in said base material.

Preferably, at least one other core layer is free of PCM. Optionally, this PCM-free core layer may act as reinforcement layer and may e.g. be formed by a glass fibre layer. It is imaginable that the core comprises at least two core layer which comprise at least one base material and encapsulated phase-change material (PCM) embedded in said base material, wherein preferably a latent heat storage capacity of these different PCM based core layers is mutually different. These differing laten heat storage capacities of different PCM based core layer can e.g. be caused by different PCM quantities used in each core layer and/or different PCM substances used in each core layer.

Preferably, the panel comprises a backing layer adhered to the lower side of the core, wherein the backing layer comprises at least one base material and encapsulated phase-change material (PCM) embedded in said base material. This further increases the latent heat storage capacity of the panel. Examples of suitable PCM materials and optional shell materials have been described above already in an extensive manner.

The invention also relates to a decorative covering comprising a plurality of, preferably interconnected, decorative panels, in particular floor panels, wall panels, ceiling panels, or alternative decorative panels, according to the invention. In case of interconnected floor panels, the floor panels could be connected directly or indirectly to each other. As mentioned above, the floor panels, could be directly connected to each other. To this end, floor panels are preferably provided with coupling profiles, wherein coupling profiles of adjacent floor panels are configured to (directly) co-act with each other, to secure the floor panels, preferably both in horizontal and vertical direction. It is also imaginable that the floor covering comprises intermediate coupling structures, such as clamps, wherein adjacent floor panels are mutually coupled by means of at least one such a coupling structure. To this latter end, the floor panels may or may not be provided with coupling profiles.

BRIEF DESCRIPTION OF THE DRAWINGS

The invention will be further explained with reference to the appended figures, wherein.

DESCRIPTION OF THE INVENTION

Figures 1, 2:
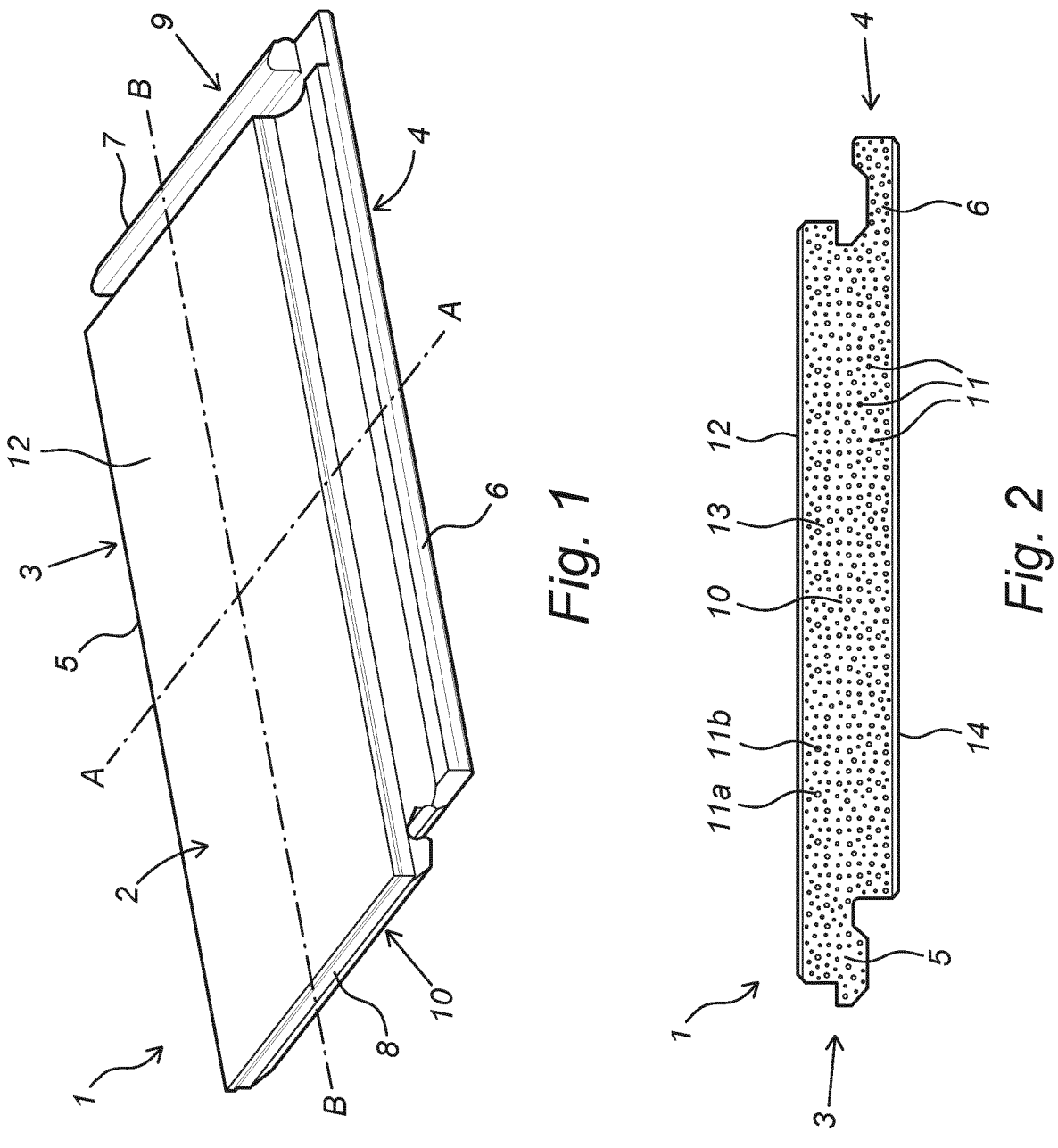
FIG. 1 shows in perspective a panel according to the invention.
FIG. 2 shows a transversal cross-section of a panel according to the invention.

FIG. 1 shows an embodiment of a decorative panel 1 which upper side 2 is provided with a decorative top structure 12. The panel is of a rectangular shape having a length extending longitudinally along line B-B, and a width extending transversally along line A-A.

At first side edges 9, a first coupling profile 7 is provided. At second side edge 9 a second coupling profile 8 is provided. At third and fourth side edges 3 resp. 4, a third coupling profile 5, resp. a fourth coupling profile 6 is provided.

FIG. 2 shows a transversal cross-section of a panel 1 shown in FIG. 1, along line A-A. The panel 1 has a core 10 comprising at least one base material 13 and encapsulated phase-change material (PCM) 11 embedded in said base material 13. The PCM capsules 11 are dispersed in a substantially uniform way throughout the core 10 in this embodiment. Onto the upper side of the core 10 a decorative top structure 12 is affixed, preferably by means of a thin waterproof adhesive layer. Onto the lower side of core 10, a backing layer is adhered. The side edges 3 resp. 4, are provided with a third coupling profile 5, resp. a fourth coupling profile 6.

In the shown embodiment, the PCM capsules 11 are composed of a substantially spherical shell 11a and a capsule core 11b. The shell 11 a is made of a solid material which remains solid while the PCM material inside the core 11b melts or solidifies. The PCM capsules 11 are embedded within the base material 13 and in this embodiment the capsules 11 are of different sizes. This is optional and the capsules 11 may also have the same size. The PCM in the capsule core 11b will be chosen depending on the application of the panel. For example, in case the decorative panel is used as outdoor panel in colder or moderate climates, a PCM with a lower melting point (e.g. 0 to 10 degrees Celsius) is typically preferred, while in case the decorative panel is used as outdoor panel in hot (desert) climates, a PCM with a lower melting point (e.g. 18 to 30 degrees Celsius) is typically preferred. It is possible that all capsules 11 comprise the same PCM in the capsule core 11b. It is also possible that different PCM materials are used, such that the core of different capsules 11 have different phase change temperatures. This way (latent) heat is released or stored at different temperature (ranges), which enables a panel to be suitable for various seasons.

Figure 3:
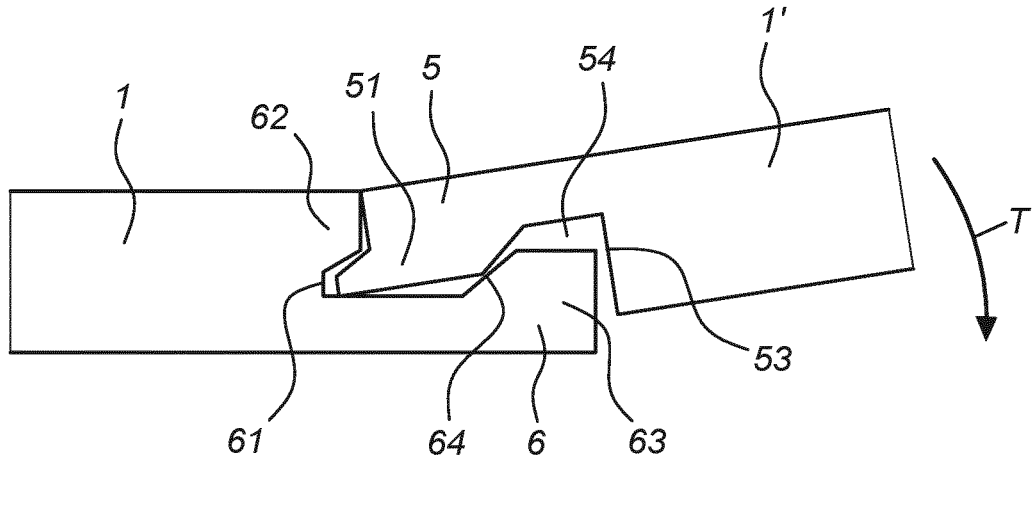
FIGS. 3 and 4 show in transversal cross-section two embodiments of coupling profiles of panels that are interconnected according to the invention.

FIG. 3 shows the third and fourth coupling profiles 5 and 6, as depicted in FIG. 2, in detail when connecting two panels 1 and 1' with each other.

The third coupling profile 5 of panel 1', comprises a sideward tongue 51 extending in a direction substantially parallel to the upper side of the panel, one second downward flank 53 lying at a distance from the sideward tongue 51, and a second downward groove 54 formed between the sideward tongue 51 and the second downward flank 53.

The fourth coupling profile 6 of panel 1, comprises a third groove 61 configured for accommodating at least a part of the sideward tongue 51 of the third coupling profile 5 of a second identical panel 1', said third groove 61 being defined by an upper lip 62 and a lower lip 63, wherein said lower lip is provided with an upward locking element 64.

In the situation shown in FIG. 3, the third coupling profile and the fourth coupling profile 6 are configured such that the respective panels 1 and 1', can be coupled to each other by means of a turning movement as indicated by arrow T, which involves the sideward tongue of panel 1' being inserted into the third groove of the other identical panel 1, wherein the upward locking element 64 of the panel 1, is inserted into the second downward groove 54 of the panel 1'.

Figure 4:
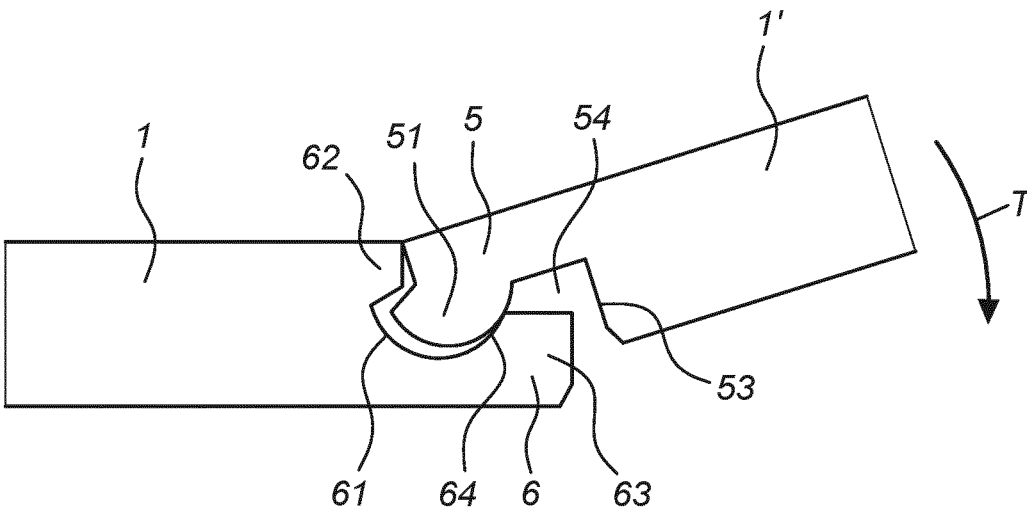

FIG. 4 shows analogously to FIG. 3, a different design of coupling profiles 5 and 6, having rounded features at tongue 51 and at third groove 61. The turning movement for coupling may also be referred to as a hinging movement in this alternative embodiment to FIG. 3. All other functional features and their numerals are the same as already defined for FIG. 3.

Figures 5, 6:
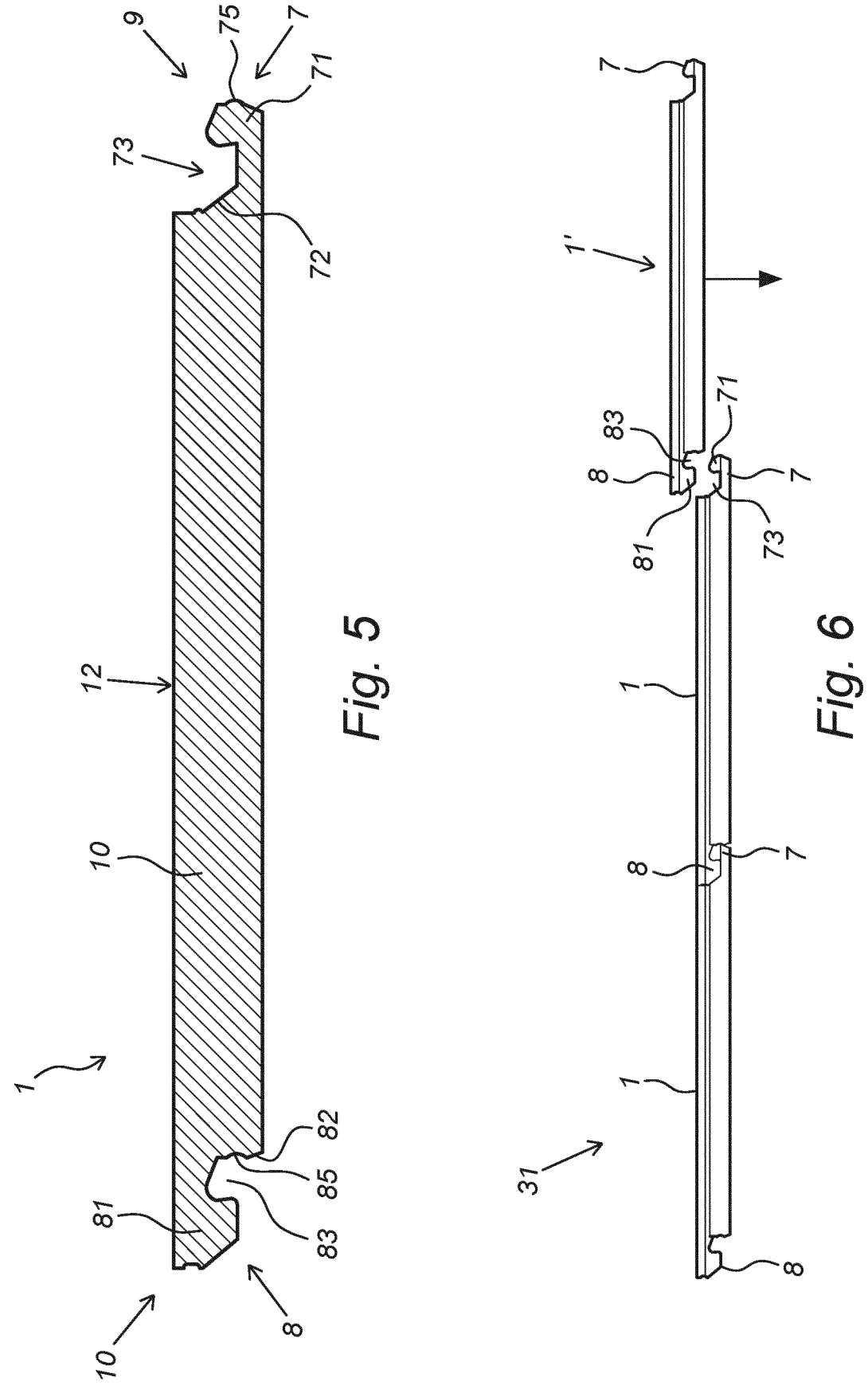
FIG. 5 shows a longitudinal cross-section of a panel according to the invention.
FIG. 6 shows in longitudinal cross-section one embodiment of coupling profiles of panels that are interconnected according to the invention.

FIG. 5 shows a longitudinal cross-section of a panel 1 shown in FIG. 1, along line B-B. The panel 1 has a core 10 that is made of a base material and encapsulated phase-change material (PCM) embedded in said base material.

Onto the upper side of the core 10 a decorative top structure 12 is adhered.

At side edges 9 resp. 10, a first coupling profile 7 resp. a second coupling profile 8 is provided.

The first coupling profile 7 comprises an upward tongue 71, an upward flank 72 lying at a distance from the upward tongue 71, an upward groove 73 formed in between the upward tongue 71 and the upward flank 72 wherein the upward groove 73 is adapted to receive at least a part of a downward tongue 81 of a second coupling profile 8 of another, identical panel, and at least one first locking element 75, preferably provided at a distant side of the upward tongue 71 facing away from the upward flank 72.

The second coupling profile 8 comprises a first downward tongue 81, a first downward flank 82 lying at a distance from the downward tongue 81, a first downward groove 83 formed in between the downward tongue 81 and the downward flank 82, wherein the downward groove 83 is adapted to receive at least a part of an upward tongue 71 of a first coupling profile 7 of another, identical panel, and a second locking element 85 adapted for co-action with a first locking element 75 of the other, identical panel, which is provided at the downward flank 82.

FIG. 6 shows how the first and second coupling profiles 7 and 8 of a panel can interact, when connecting the respective profiles 7 and 8 of a panel 1 and a panel 1', depicted at the far left. The panel 1' is hereby moved vertically downwards wherein the profiles 7 and 8 engage with each other by receiving upward tongue 71 in downward groove 83 and receiving downward tongue 81 in upward groove 73.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application. Various embodiments of the panel as described above and in the appended claims may be combined with this alternative panel configuration.

By "horizontal" is meant a direction which extends parallel to a plane defined by the floor panel, and which may intersect the core. By "vertical" is meant a direction which is perpendicular to said plane defined by the floor panel.

The ordinal numbers used in this document, like "first", "second", and "third" are used only for identification purposes. Hence, the use of the expressions "third locking element" and "second locking element" does therefore not necessarily require the co-presence of a "first locking element".

By "complementary" coupling profiles is meant that these coupling profiles can cooperate with each other. However, to this end, the complementary coupling profiles do not necessarily have to have complementary forms. The "floor panel" according to the invention may also applied as wall covering element, ceiling covering element, or alternative covering element. In case in this document reference is made to a "floor tile" or "floor panel", these expressions may be replaced by expressions like "tile", "wall tile", "ceiling tile", "covering tile".

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, in particular a floor panel, wall panel, or ceiling panel, comprising:
   a core provided with an upper side and a lower side,
   a decorative top structure affixed, either directly or indirectly, on said upper side of the core,
   a first coupling profile situated at a first panel edge, and a second coupling profile situated at a second panel edge, wherein the first coupling profile is configured to co-act with a second coupling profile of an adjacent panel, preferably such that the panels are locked with respect to each other both in horizontal and vertical direction,
   wherein the core comprises at least one base material and encapsulated phase-change material (PCM) embedded in said base material, and
   wherein the quantity of PCM dispersed in the core is situated between 10 and 50% by weight of the core.

2. The decorative panel according to claim 1, wherein the core comprises a plurality of PCM capsules dispersed within said base material.

3. The decorative panel according to claim 2, wherein the core comprises a plurality of PCM capsules substantially uniformly dispersed within at least an upper zone of said base material.

4. The decorative panel according to claim 2, wherein the mean diameter of the PCM capsules is situated in between 5 and 75 micron.

5. The decorative panel according to claim 2, wherein at least a fraction of the PCM capsules is composed of a shell filled with PCM.

6. The decorative panel according to claim 5, wherein the shell is at least partially made of a material chosen from the group consisting of: a metal, a polymer, and an inorganic material.

7. The decorative panel according to claim 5, wherein the shell is at least partially made of a material chosen from the group consisting of: styrene/methyl methacrylate (St/MMA) copolymer, polystyrene (PS), polymethylmethacrylate (PMMA), polyurea, melamine-formaldehyde (MF resin), urea-formaldehyde, gelatine-gum Arabic, gum Arabic-modified starch, chitosan, silk fibroin, soybean protein, 1-dodecanol, a biodegradable polymer, a biobased substance, and combinations thereof.

8. The decorative panel according to claim 5, wherein the shell is at least partially made of an inorganic material chosen from the group consisting of: silica and titanium oxide.

9. The decorative panel according to claim 5, wherein the PCM/shell weight ratio is between 80/20 and 50/50.

10. The decorative panel according to claim 5, wherein the shell is provided with a coating to improve the adhesion of the shell to the surrounding base material.

11. The decorative panel according to claim 1, wherein the PCM is at least partially composed of a biobased organic material derived either from plants or from animals.

12. The decorative panel according to claim 1, wherein the PCM is at least partially composed of a paraffin material.

13. The decorative panel according to claim 1, wherein the PCM is at least partially composed of a salt hydrate.

14. The decorative panel according to claim 1, wherein the decorative top structure comprises at least one polymeric wear layer in which further PCM capsules are encapsulated.

15. The decorative panel according to claim 1, wherein the core comprises at least two polymer sublayers laminated together, wherein a PCM layer is embedded in between said polymer layers.

16. The decorative panel according to claim 1, wherein the core comprises a laminate of a plurality of core layers, wherein at least one core layer comprises at least one base material and encapsulated phase-change material (PCM) embedded in said base material.

17. The decorative panel according to claim 1, wherein the panel comprises a backing layer adhered to the lower side of the core, wherein the backing layer comprises at least one base material and encapsulated phase-change material (PCM) embedded in said base material.

18. A decorative covering, comprising a plurality of decorative panels according to claim 1.

* * * * *